(12) United States Patent
Hatch

(10) Patent No.: US 6,254,301 B1
(45) Date of Patent: Jul. 3, 2001

(54) THERMOSET RESIN-FIBER COMPOSITES, WOODWORKING DOWELS AND OTHER ARTICLES OF MANUFACTURE MADE THEREFROM, AND METHODS

(76) Inventor: J. Melvon Hatch, 4850 S. Hidden Cove Cir., Murry, UT (US) 84123

( * ) Notice: Subject to any disclaimer, the term of this patent is extended or adjusted under 35 U.S.C. 154(b) by 0 days.

(21) Appl. No.: 09/240,531

(22) Filed: Jan. 29, 1999

(51) Int. Cl.⁷ ..................................................... F16B 13/00
(52) U.S. Cl. ........................ 403/298; 403/266; 403/292; 411/908
(58) Field of Search ..................................... 411/908, 513, 411/514; 403/298, 292, 294, 266, 267

(56) References Cited

U.S. PATENT DOCUMENTS

| | | | |
|---|---|---|---|
| 3,883,258 | * 5/1975 | Hewson | ................................ 403/298 |
| 3,965,051 | 6/1976 | Markusch et al. . | |
| 4,623,290 | * 11/1986 | Kikuzawa et al. | ................ 411/513 X |
| 4,857,252 | 8/1989 | Melchior et al. . | |
| 5,083,888 | * 1/1992 | Gapp et al. | ....................... 411/908 X |
| 5,259,686 | 11/1993 | Hatch . | |
| 5,338,569 | 8/1994 | Hatch . | |
| 5,346,930 | 9/1994 | Maine et al. . | |
| 5,807,015 | * 9/1998 | Goto | ................................. 403/292 X |

* cited by examiner

Primary Examiner—Lynne H. Browne
Assistant Examiner—John R. Cottingham
(74) Attorney, Agent, or Firm—TraskBritt

(57) ABSTRACT

A composite material including a thermosetting resin and a fibrous filler material. The composite material is preferably fabricated by dry mixing the thermosetting resin, in powdered form, with the fibrous filler material, and applying an elevated pressure to the dry mixture. The thermosetting resin preferably cures while the mixture is subjected to the elevated pressure. The dry mixture may also be subjected to an elevated temperature. The hardened mass of composite material may be formed into the shape of a desired article of manufacture as an elevated pressure is applied thereto. Alternatively, an article of manufacture may be fabricated from the block of the composite material after formation of the block. The composite material will adhere to glues that have conventionally been used to adhere pieces of wood or wood-like material to one another. Thus, a dowel fabricated from the composite material may be used, in combination with a wood-working glue, to secure two pieces of wood or wood-like material together.

18 Claims, 4 Drawing Sheets

THERMOSET RESIN-FIBER COMPOSITES, WOODWORKING DOWELS AND OTHER ARTICLES OF MANUFACTURE MADE THEREFROM, AND METHODS

BACKGROUND OF THE INVENTION

1. Field of the Invention

The present invention relates to dowels used in the woodworking industry to secure two pieces of wood or wood-like material together. In particular, the present invention relates to novel dowels made of a thermosetting resin, a process for making such dowels, and methods of using such dowels.

2. Background of Related Art

In manufacturing cabinets, furniture, and other articles from wood or wood-like material, adjoining pieces of wood are often held securely together with dowels and an adhesive, such as woodworking glue. Conventionally, dowels have been made of wood. Wood costs have increased substantially in recent years and, in turn, the cost of wooden dowels has increased.

In conventional woodworking practice, receiving cavities are formed in each of the respective pieces of wood or wood-like material that are to be adjoined. When the pieces of wood or wood-like material are assembled, glue is typically injected into the dowel receiving cavities. Dowels are then inserted into the cavities and held there by the glue. Alternatively, pre-glued dowels may be employed. Water is typically applied to the dowel cavities and the dowels are moistened to activate the glue as the dowels are inserted into the cavities. U.S. Pat. No. 5,338,569 (Hatch).

It has been suggested to make dowels from thermoforming plastic materials, but such dowels are typically incapable of adhering to the glues used in the woodworking industry. Thus, plastic dowels have heretofore required surface features that create a frictional engagement with the wood into which the dowels are inserted. This frictional engagement may not result in nearly as much bonding strength as is obtained with wood dowels that are glued in the cavities. Thus, thermoplastic dowels have not been widely used in the commercial manufacture of furniture and other articles from wood.

Materials such as fiberboard are able to adhere to glues that have conventionally been employed in the woodworking industry.

Medium density fiberboard ("MDF" or "MDFB") and high-density fiberboard ("HDF" or "HDFB"), which have been conventionally referred to as particle board, include wood chips and, thus, conserve wood by employing wood scraps that are by-products of other wood processing or recycled wood. Typically, particle board has a density of about 45 lbs/ft$^3$ to about 55 lbs/ft$^3$. Due to high wood or cellulose content, fiber boards have similar properties to those of wood. While the densities of these materials are about the same or even greater than those of some types of woods, the strengths of these materials and, thus, the strength with which a dowel made from these materials secures two pieces of wood or wood-like material together is typically lower than that of some types of wood.

Fiberboard, including MDF and HDF, may be fabricated from particles, pieces or chunks of wood of mixed characteristics, and a resinous binder material. U.S. Pat. No. 4,857,252 (hereinafter "the '252 Patent"), issued to Melchior et al. on Aug. 15, 1989, discloses an exemplary process for fabricating fiber board. The process disclosed in the '252 Patent includes processing a wet mixture of thermosetting resin and paper, cardboard, or kraft fibers under caustic conditions through a paper machine to provide a sheet of the mixture including 95–98% solids, then subjecting the mixture to a high temperature to dry the mixture and cure the thermosetting resin. The process of the '252 Patent is time-consuming, requires expensive equipment, and is not useful for fabricating relatively thick layers of dense composite material and, in turn, is not useful for making dowels.

Accordingly, there is a need for a dowel that has comparable strength and comparable adherence to adhesives as wood dowels. There is also a need for a process of fabricating dense composite products with these properties suitable for use as a dowel.

SUMMARY OF THE INVENTION

The dowels of the present invention are fabricated from a composite material including thermosetting resin and a fibrous filler material. The composite dowel will adhere to adhesives, such as the glues conventionally used in the woodworking industry. When glued into a cavity of a piece of wood or wood-like material, such as medium density fiberboard or high density fiberboard, the composite dowel of the present invention will bond to the wood or wood-like material with a bonding strength comparable to that of a wooden dowel that is glued into an identical cavity in the piece of wood or wood-like material with substantially the same amount of the same type of glue.

The composite material from which the composite dowel of the present invention is fabricated preferably includes about 4% to about 90% by weight thermosetting resin, or an amount of thermosetting resin sufficient to flow throughout and bind the fibrous filler material together, and about 10% to about 96% by weight fibrous filler material, or an amount of fibrous filler material sufficient to impart the composite material with the desired properties.

The thermosetting resin and the fibrous filler material are mixed together, and then subjected to a high pressure and, preferably, an elevated temperature, to set the thermosetting resin and form a dense mass of composite material. Preferably, the mixture of thermosetting resin and fibrous filler material is subjected to a specific pressure of at least about 3500 pounds per square inch, or a pressure sufficient to cause the thermosetting resin to flow or set, or a pressure sufficient to form a dense mass of composite material. The mixture of thermosetting resin and fibrous filler material is preferably subjected to elevated pressure for at least about 60 seconds, or a time that permits the resin to begin flowing and to set, to form the mass of composite material. A preferred elevated temperature is from about 95° C., or a temperature that will cause the thermosetting resin to flow and set, to about 230° C., or a temperature at which a fibrous filler material such as paper begins to combust. The thermosetting resin preferably sets, or cures, while the mixture of thermosetting resin and fibrous filler material is subjected to pressure to facilitate the fabrication of a composite material having a desired density.

The density and strength of the composite material increase when greater pressures are employed to form the composite material. Accordingly, the strength of the composite materials of the present invention may be tailored by applying a specific amount of force to the mixture of thermosetting resin and fibrous filler material for a specific duration of time. Preferably, a mass of composite material according to the present invention has a density of at least about 75 pounds per cubic foot.

A preferred temperature for setting the mixture is about 90 degrees C., although ambient and other temperatures may be employed. Of course, the optimal temperatures at which the composite material may be formed depend upon the type of thermosetting resin employed in the composite material and the amount of pressure employed to fabricate the composite material.

The degree to which the thermosetting resin flows through the fibers of the fibrous filler material during the formation of the composite material also increases with an increase in the amount of pressure applied to the mixture of thermosetting resin and fibrous filler material. The fibrous filler material imparts the composite material with surface porosity.

The composite material of the present invention adheres to adhesives employed in woodworking, such as water-based adhesives, resinous adhesives, animal-based glues (e.g., horse-hide glues), and chemically manufactured glues. Thus, the composite material of the present invention is useful in woodworking applications where adhesion of an article of the composite material to a piece of wood or wood-like material is desired. For example, the mass of composite material may be formed into the cylindrical shape of a dowel. The mass of composite material may be molded substantially into the shape of a dowel or a precursor shape (e.g., a series of laterally-adjoined, substantially cylindrical members) during fabrication of the composite material. Alternatively, a dowel may be subsequently formed from a block of the composite material.

A composite dowel according to the present invention may have a substantially smooth surface. Alternatively, the surface of the composite dowel may have an enhanced surface area, such as a fluting along the length thereof. Composite dowels having enhanced surface area may adhere to an adjacent surface of a structure of wood or wood-like material, may provide a space for glue or other adhesive between the surface of the composite dowel and the surface of the adjacent structure and, if the dowel has a larger diameter than a hole in the adjacent structure, may facilitate the formation of an interference fit between the hole and the composite dowel. Dowels having other types of enhanced-area surfaces, as well as dowels with other surface features (e.g., circumferentially spaced-apart ribs), are also within the scope of the present invention.

Other articles of manufacture may also be fabricated from the composite material. Exemplary articles that may be fabricated from the composite material include, without limitation, structural members (e.g., floor joists, elongated boards, and other substitutes for conventional wood members), hardwood flooring (which would preferably include a veneer), and decking or fencing (melamine formaldehyde resists degradation caused by ultraviolet (UV) light and, thus, the composite material would facilitate the fabrication of decking with enhanced life).

Additional features and advantages of the present invention will become apparent from the ensuing description, the accompanying drawings, and the appended claims.

DETAILED DESCRIPTION OF THE PREFERRED EMBODIMENTS

Figure 1:
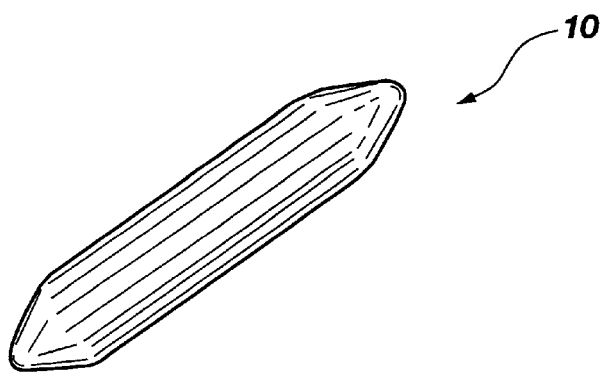
FIG. 1 is a perspective view of a dowel of composite material according to the present invention.
Figure 1B:
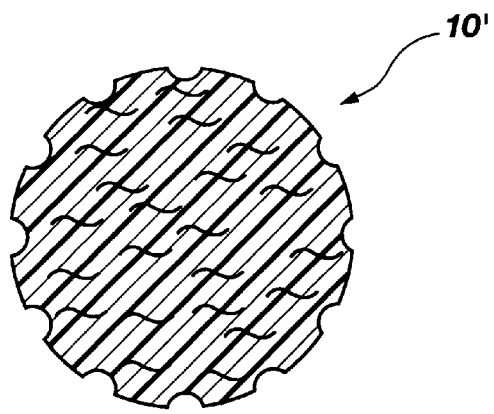
FIG. 1B is a cross-sectional view of a dowel having a fluted surface.
Figure 1A:
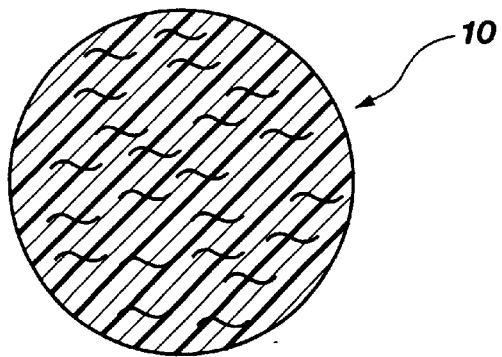
FIG. 1A is a cross-sectional view of a dowel having a substantially smooth surface.

With reference to FIGS. 1–1B, a composite dowel 10 (10' in FIG. 1B) is illustrated. The composite dowel 10, is formed of a composite material, such as a thermosetting resin and a fibrous filler. A composite dowel 10 so fabricated has physical properties (e.g., strength, durability, porosity, cost, and so on) equivalent or superior to those of conventional wood dowels.

The composite material may comprise from about 4% to 90% by weight thermosetting resin and from about 10% to 96% by weight fibrous filler material. The thermosetting resin imparts the composite material with strength, while the fibrous filler material facilitates adherence of the composite material to adhesives, such as the glues typically used in the woodworking industry. Thus, the fibrous filler material preferably forms a substantially continuous matrix, the interstices of which are preferably substantially fully imbibed with thermosetting resin. In a preferred embodiment, the dowel of the present invention comprises from about 5% to 30% by weight thermosetting resin and, most preferably, from about 15% to 30% by weight thermosetting resin.

Exemplary thermosetting resins that are useful in the composite material of the present invention include, without limitation, melamine formaldehyde, melamine urea formaldehyde, urea formaldehyde, phenol formaldehyde, polyesters, polyurethane, and mixtures thereof.

The fibrous filler of the composite material of the dowels or other articles of manufacture of the present invention may comprise cardboard or paper fibers, sawdust, carpet fibers or other textile fibers, or other types of cellulose-containing fibers. Fibers of nylon or polyester may also be employed in the composite material of the present invention.

Preferably, the fibrous filler material employed in the composite material of the present invention is comminuted, which, for purposes of this disclosure, is meant to encompass materials that have been ball milled, shredded or cut to a size that will pass through a screen having a mesh size of up to about three-eighths inch. For example, when sawdust is employed as the fibrous filler material, the sawdust is preferably in the form of coarse particles and/or small wood chips, which is also referred to as "rough" sawdust. As another example, when cardboard fibers are employed as the fibrous filler, shredded, corrugated cardboard is preferably used.

A preferred composite material for use in the composite dowels 10 of the present invention includes a melamine formaldehyde resin and shredded, or ground, corrugated cardboard having mixed characteristics (i.e., including various sizes ranging from small particles to larger pieces). For example, the cardboard may have a mesh size (i.e., the size of the largest pieces) of about ⅜ inch or less, although larger pieces may be useful in some applications of the composite material. The melamine formaldehyde resin may comprise at least about 5% of the composite material by weight, and preferably comprises about 15 to 30% of the weight of the composite material. Another preferred embodiment of the composite material of the present invention includes melamine formaldehyde resin and rough sawdust, including large sawdust particles and small (i.e., preferably a largest dimension of about ⅜ inch or less, although particles or pieces having larger dimensions, such as a largest dimension of ½ inch, ¾ inch, or greater could be employed, depending upon the desired use of the composite material) wood chips.

The thermosetting resin and the fibrous filler material are thoroughly mixed together. Preferably, the thermosetting resin is in dry, powdered form and, thus, the mixture is a substantially dry mixture of thermosetting resin and fibrous filler material. The substantially dry mixture is subjected to an elevated pressure and, preferably, an elevated temperature, which, in turn causes the thermosetting resin to flow and subsequently harden or set. Thus, a dense, hardened mass of composite material is formed.

Figure 2:
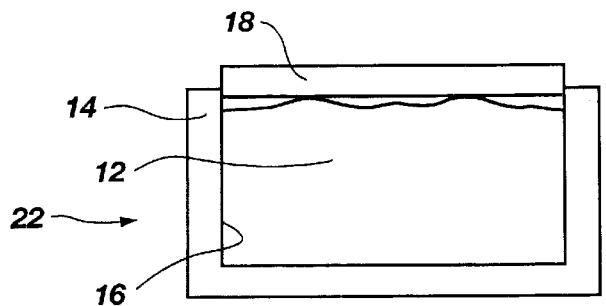
FIGS. 2–4 are cross-sectional schematic representations of the process of the method of fabricating the composite material of the present invention.
Figure 3:
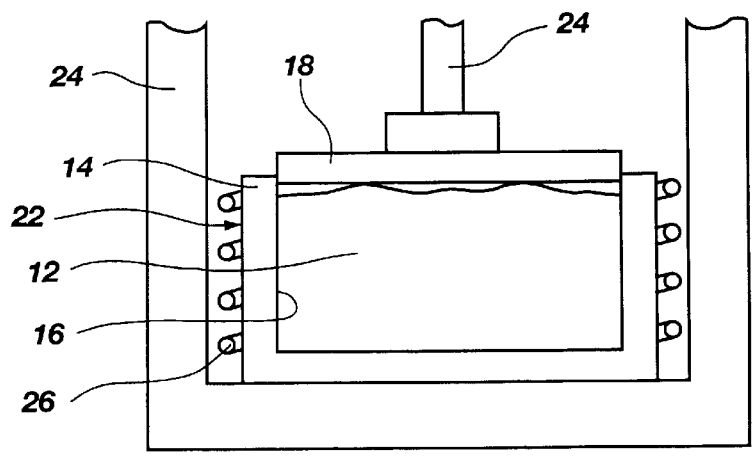
Figure 4:
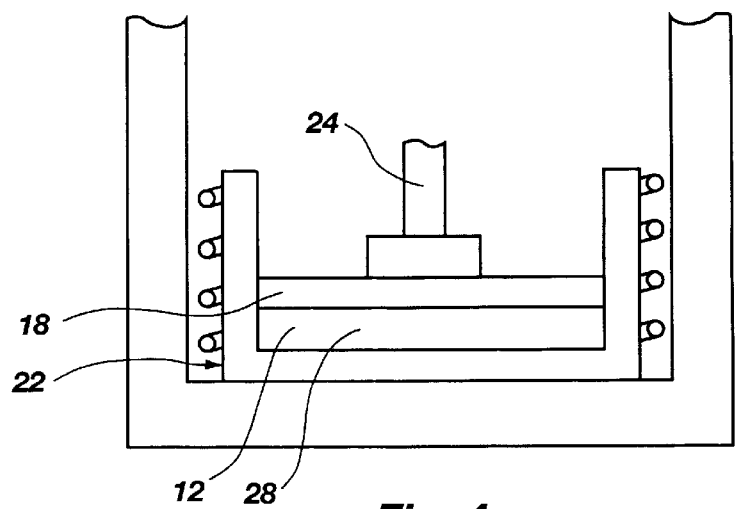

Referring now to FIGS. 2–4, a preferred embodiment of the method of making the composite material of the present invention is illustrated. As illustrated in FIG. 2, after the thermosetting resin and fibrous filler material have been thoroughly mixed, the mixture 12 is disposed within the cavity 16 a mold 14 of a type known in the art, such as an aluminum mold or a steel mold, that will withstand the temperatures and pressures employed in the method. A mold cover 18, which is insertable into cavity 16 and preferably shaped complementary thereto, is disposed over mold 14 and positioned over cavity 16.

As shown in FIG. 3, the assembly 22 of mold 14 and cover 18 is positioned within a press 24 of a type known in the art. A heating element 26 may be disposed around assembly 22 to heat mold 14 and the mixture 12 therein. Heating element 26 may be used to preheat mold 14 prior to disposing mixture 12 in cavity 16. Alternatively, mold 14 and mixture 12 may be pre-heated prior to the application of pressure to mixture 12. As another alternative, mold 14 and mixture 12 may be heated substantially simultaneously with the application of pressure to mixture 12.

A catalyst that facilitates setting of the thermosetting resin may also be dispersed throughout mixture 12 before applying pressure thereto. Such catalysts and the thermosetting resins with which they are compatible are known. When a catalyst is employed to facilitate or accelerate flowing and setting of the thermosetting resin, it may not be necessary to heat mixture 12. If a sufficient quantity of catalyst is employed to eliminate need to heat mixture 12, however, it may be necessary to apply pressure to, or compress, mixture 12 immediately following the addition of the catalyst thereto.

Similarly, as is known to those of skill in the art, it may not be necessary to heat mixture 12 if sufficient pressure is applied thereto, as pressure alone may cause the thermosetting resin to flow and set.

Turning now to FIG. 4, as press 24 applies pressure against cover 18, mixture 12 is substantially uniformly compressed, the thermosetting resin of mixture 12 liquifies, and the thermosetting resin sets and forms a mass of composite material 28. Preferably, several hundred thousand pounds of absolute pressure, which translates to hundreds or thousands of pounds per square inch (psi) of specific or gauge pressure, is applied to mixture 12 to form composite material 28. For example, when about 880,000 pounds of pressure are applied to a mixture 12 having an upper surface area of about 4 inches by 37 inches (i.e., about 150 square inches), about 6000 psi (i.e., 880,000 pounds divided by 150 square inches) of specific pressure is applied to mixture 12. Preferably, a specific pressure of at least about 3500 psi is applied to mixture 12. "About 3500 psi" as defined herein refers to a pressure that is sufficient to cause the thermosetting resin to flow or to form a dense mass of composite material.

The following examples set forth specific formulas and fabrication parameters of some of the preferred embodiments of the composite material of the present invention.

EXAMPLE 1

Approximately 6.7 parts, by weight, shredded corrugated cardboard is dry-mixed with approximately one part, by weight, powdered melamine formaldehyde resin 805, manufactured by BLT Specialty Resins. The dry mixture is then disposed into the cavity of a mold, and the mold cover disposed over the mold. The mold and the dry mixture are then heated to about 150° C., a temperature sufficient to cause the thermosetting resin to flow or to set, as about 9500 psi of specific pressure is applied to the mold cover and, thus, to the dry mixture within the mold cavity. This pressure is maintained for about 4 minutes. The resulting block of composite material has a density of at least about 95 lbs/f$^3$.

EXAMPLE 2

Approximately two parts, by weight, of shredded corrugated cardboard, two parts, by weight, coarse sawdust, and one part, by weight, powdered melamine urea formaldehyde resin MUF 412, manufactured by BLT Specialty Resins, are dry-mixed and disposed within the cavity of a mold. After a mold cover is disposed over the mold, the mold and the dry mixture are heated to about 150° C. as about 5000 psi specific pressure is applied to the mold cover and, thus, to the dry mixture therein. The pressure and temperature are maintained for at least about three minutes.

EXAMPLE 3

Approximately 6.7 parts, by weight, shredded corrugated cardboard and about one part, by weight, melamine formaldehyde resin 805 are dry mixed and disposed within the cavity of a mold. A mold cover is disposed over the mold, the mold and the dry mixture therein are heated to about 150° C., and about 3500 psi specific pressure is applied to the mold cover and, thus, to the dry mixture therein for at least about 2½ minutes.

EXAMPLE 4

Comminuted, corrugated paper boxing is dry-mixed with melamine formaldehyde resin in a ratio of about 6.7 parts, by weight, comminuted, corrugated paper and one part, by weight, resin. The mixture was placed into a mold cavity, and a mold cover disposed over the mold. The mixture was then compressed at a pressure of about 3500 psi for about 2.5 minutes. The temperature of the mixture in the press was elevated to about 150° C. The resin set while the mixture was being compressed in the mold, and a mass of hard, substantially homogenous material was removed therefrom.

An article of manufacture, such as a woodworking dowel, may be formed from composite material or from a block of composite material following the fabrication of a block of composite material.

Figure 5:
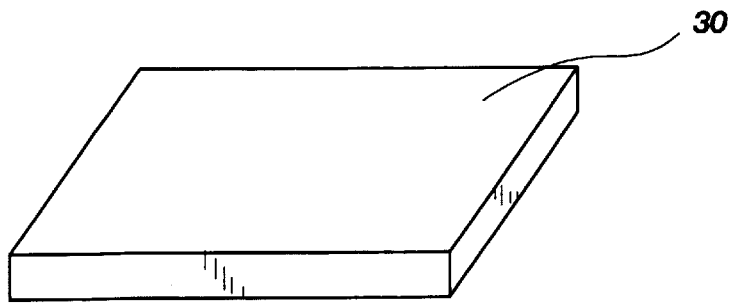
FIG. 5 is a perspective view of an exemplary block of composite material that may be manufactured in accordance with the process depicted in FIGS. 2–4.

FIG. 5 depicts a rectangular block 30 of composite material 28, which may subsequently be formed into the shape of a dowel or other article of manufacture, as known the art, such as by cutting or milling.

The structural integrity of the composite material of block 30 is such that cylindrical dowels or other articles of manufacture can be cut or formed therefrom with extremely close tolerances, similar to the tolerances employed when forming similar articles from wood (e.g., about three mils when forming a dowel).

Figure 6:
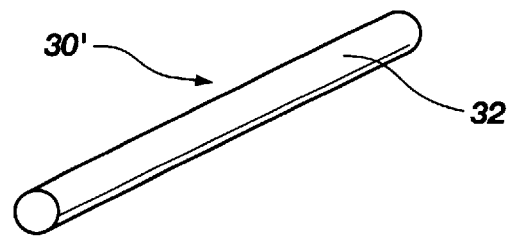
FIGS. 6 and 6A are perspective views of formed articles fabricated in accordance with the process depicted in FIGS. 2–4.
Figure 6A:
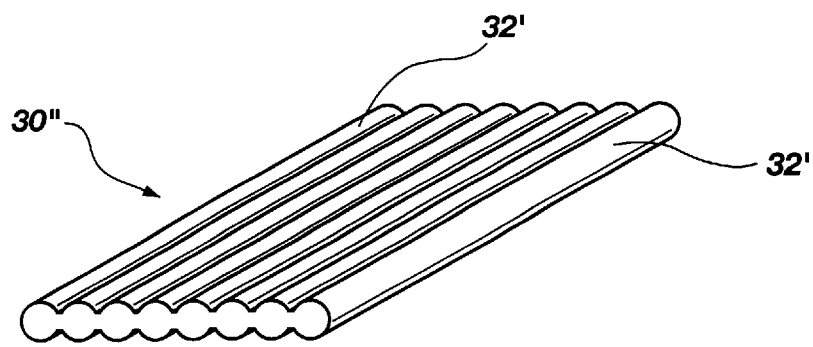

Alternatively, as shown in FIGS. 6 and 6A, composite material 28 may be formed into a desired shape 32, such as the substantial shape of the dowel, as pressure is applied to mixture 12. When block 30', 30" is molded and compressed so as to have a substantially cylindrical shape 32 (FIG. 6) or as a plurality of laterally-adjoined cylindrical members 32' (FIG. 6A), block 30', 30" can be cut or milled into pieces having the desired configuration and size of the dowels. Again, during molding, the configuration and size of shape 32 can be controlled so that the tolerances thereof are very small (e.g., about three mils when shape 32 is a dowel shape).

If the article of manufacture is a dowel, a water soluble glue may be applied to the surfaces of the dowel by known techniques, such as by the processes disclosed in U.S. Pat. Nos. 5,259,686 and 5,338,569, which issued to Hatch on Nov. 9, 1993 and Aug. 16, 1994, respectively, the disclosures of both of which are hereby incorporated in their entirety by this reference.

Figure 7:
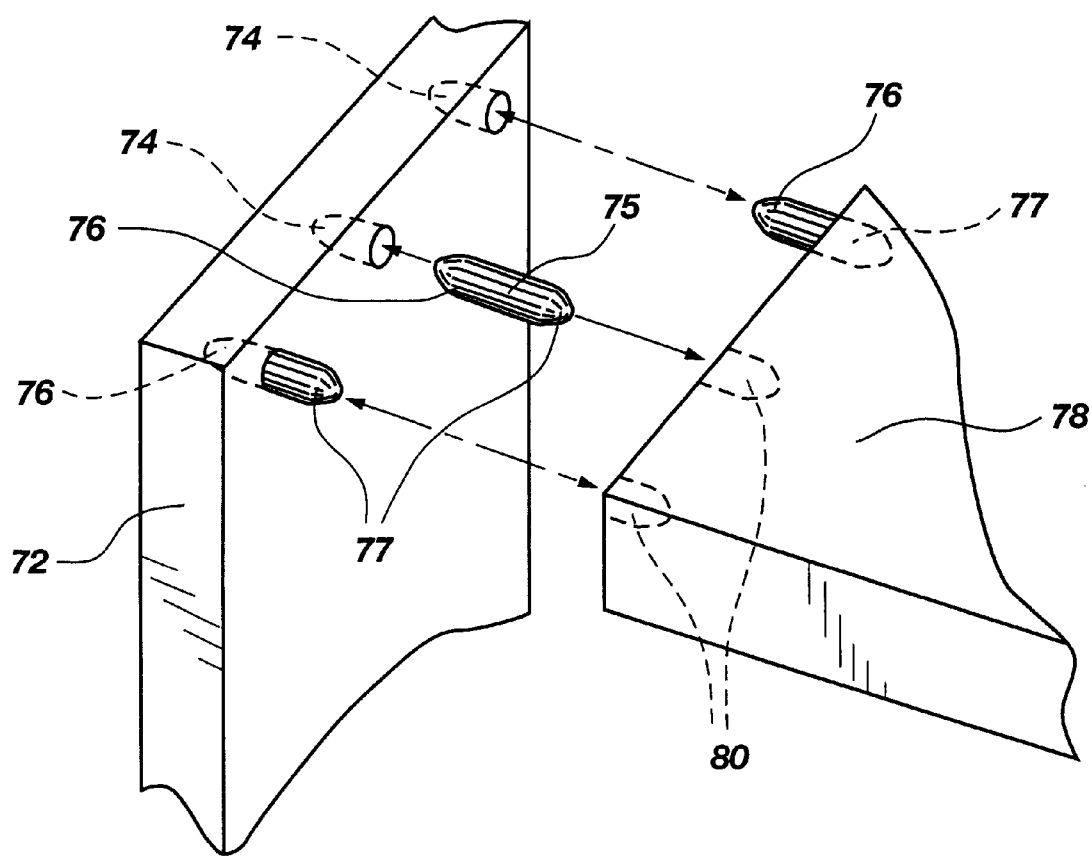
FIG. 7 is an assembly view depicting a process of securing members of wood or wood-like material together with the composite material dowel of the present invention.

Turning now to FIG. 7, a dowel made from the composite material may be employed to secure two pieces 72, 78, or members, of wood or wood-like material together. In the process of securing two pieces of wood or wood-like material together, a first hole 74, which has dimensions complementary to a first end 76 of a dowel 75 to be inserted therein, is formed in a first member 72 of wood or wood-like material. A second hole 80, which has dimensions complementary to a second end 77 of dowel 75, is formed in a second member 78 of wood or wood-like material to be secured to first member 72. A quantity of adhesive, such as a glue commonly employed in the woodworking industry, may be applied to the surfaces of first hole 74 and second hole 80, or to the surfaces of dowel 75. Alternatively, if a pre-glued dowel is employed, the adhesive thereon may be moistened. First end 76 and second end 77 of dowel 75 are then inserted into and secured within first hole 72 and second hole 80, respectively, and the adhesive is permitted to set.

As an example of the strength with which the composite dowels of the present invention adhere to a piece of wood or wood-like material when secured thereto with an adhesive, such as a polyvinylacetate glue or other glues commonly employed in the woodworking industry, dowels fabricated from the composite material of Example 4 were compared with thermoplastic dowels, such as dowels fabricated from nylon, polyethylene, polypropylene and polyvinyl chloride (PVC), and conventional wood dowels of substantially the same size and configuration. PVC dowels were employed in the comparison.

The dowels of each type were divided into two subgroups. The dowels in the first sub-group were inserted into dowel holes with no glue applied to the dowels or in the dowel holes. The dowels of the second subgroup were inserted into dowel holes in which a pre-measured amount of polyvinylacetate glue, which has been conventionally used in the woodworking industry for gluing dowels in dowel holes. After allowing the glue to set for a sufficient period of time, the dowels of both the first and second groups were tested to determine the force needed to pull the dowels longitudinally out of the dowel holes.

The unglued dowels fabricated from the composite material of Example 4 could be pulled out of their respective dowel holes with a force of between 140 and 180 pounds tensile pull. The unglued PVC dowels could be pulled out of their respective dowel holes with a force of about 120 pounds tensile pull. The unglued wood dowels could also be removed from their respective holes with about 140 to 180 pounds tensile pull.

The composite dowels fabricated from the material of Example 4 that had been glued into their respective dowel holes required a force of about 360 to 580 pounds tensile pull to be removed from their respective dowel holes. The glued PVC dowels of the second sub-group could be pulled out of their respective dowel holes with a force of about 110 to 120 pounds tensile pull. About 360 to 580 pounds tensile pull was required to remove the glued wood dowels from their respective holes.

Thus, it is apparent that the composite material from which the dowels of the present invention were fabricated will adhere to adhesives employed in woodworking with similar strength as the adherence of wood dowels to these adhesives.

Although the foregoing description contains many specifics, these should not be construed as a limiting the scope of the present invention, but merely as providing illustrations of some of the presently preferred embodiments. Similarly, other embodiments of the invention may be devised which do not depart from the spirit or scope of the present invention. The scope of this invention is, therefore, indicated and limited only by the appended claims and their legal equivalents, rather than by the foregoing description. All additions, deletions and modifications to the invention as disclosed herein and which fall within the meaning of the claims are to be embraced within their scope.

What is claimed is:

1. A woodworking dowel having a length and a cross section sized to register with a dowel receiving aperture formed in a substrate, said woodworking dowel being formed of a rigid composite material that adheres with woodworking adhesives, that has a density of at least about 75 pounds per cubic foot, and that includes about 4% to about 90% by weight of thermosetting resin and about 10% to about 96% by weight of fibrous filler material.

2. The woodworking dowel of claim 1, wherein said thermosetting resin comprises melamine formaldehyde or melamine urea formaldehyde.

3. The woodworking dowel of claim 1, wherein said fibrous filler material comprises cardboard or wood pieces.

4. The woodworking dowel of claim 1, wherein said thermosetting resin comprises from about 5% to 30% by weight of the composite material.

5. The woodworking dowel of claim 4, wherein said thermosetting resin comprises from about 15% to 30% by weight of the composite material.

6. The woodworking dowel of claim 1, wherein said woodworking dowel is configured to adhere to an aqueous woodworking adhesive with at least about 300 pounds of tensile pull.

7. The woodworking dowel of claim 1, including at least one flute in a surface thereof, said at least one flute being configured to receive a quantity of woodworking adhesive.

8. A woodworking dowel, comprising a rigid composite material that adheres with woodworking adhesives, said rigid composite material having a density of at least about 75 pounds per cubic foot and including about 4% to about 90% by weight of thermosetting resin and about 10% to about 96% by weight of fibrous filler material, said woodworking dowel being configured to register with a dowel receiving aperture formed in a substrate.

9. The woodworking dowel of claim 8, wherein said thermosetting resin comprises melamine urea formaldehyde.

10. The woodworking dowel of claim 8, wherein said thermosetting resin comprises from about 5% to 30% by weight of the composite material.

11. The woodworking dowel of claim 10, wherein said thermosetting resin comprises from about 15% to 30% by weight of the composite material.

12. The woodworking dowel of claim 8, wherein said composite material has a density of at least about 95 pounds per cubic foot.

13. The woodworking dowel of claim 8, wherein said woodworking dowel is configured to adhere to said woodworking adhesive with at least about 300 pounds of tensile pull.

14. The woodworking dowel of claim 8, including at least one flute in a surface thereof, said at least one flute being configured to receive a quantity of woodworking adhesive.

15. A woodworking dowel, comprising a rigid composite material including thermosetting resin and fibrous filler material, said woodworking dowel being configured to register with a dowel receiving aperture formed in a substrate and including at least one flute formed in a surface thereof, said at least one flute being configured to receive a quantity of woodworking adhesive.

16. The woodworking dowel of claim 15, wherein said composite material has a density of at least about 95 pounds per cubic foot.

17. The woodworking dowel of claim 15, wherein said surface adheres to woodworking adhesive.

18. The woodworking dowel of claim 17, wherein said surface is configured to adhere to woodworking adhesive with at least about 300 pounds of tensile pull.

* * * * *

UNITED STATES PATENT AND TRADEMARK OFFICE
CERTIFICATE OF CORRECTION

PATENT NO. : 6,254,301 B1  
DATED : July 3, 2001  
INVENTOR(S) : J. Melvon Hatch It is certified that error appears in the above-identified patent and that said Letters Patent is hereby corrected as shown below:

Column 5,
Line 16, insert a comma after "turn"

Column 7,
Line 58, change "subgroup" to -- sub-group --

Signed and Sealed this

Fifteenth Day of April, 2003

JAMES E. ROGAN
*Director of the United States Patent and Trademark Office*